US010833512B2

United States Patent
Remboski et al.

(10) Patent No.: US 10,833,512 B2
(45) Date of Patent: Nov. 10, 2020

(54) CELL BALANCING WITH LOCAL SENSING AND SWITCHING

(71) Applicants: Neapco Intellectual Property Holdings, LLC, Farmington Hills, MI (US); Aware Mobility LLC, Ann Arbor, MI (US)

(72) Inventors: Donald Remboski, Ann Arbor, MI (US); Jacqueline Dedo, Wolverine Lake, MI (US)

(73) Assignee: Neapco Intellectual Property Holdings, LLC, Farmington Hills, MI (US)

( * ) Notice: Subject to any disclaimer, the term of this patent is extended or adjusted under 35 U.S.C. 154(b) by 78 days.

(21) Appl. No.: 16/188,551

(22) Filed: Nov. 13, 2018

(65) Prior Publication Data
US 2019/0148952 A1 May 16, 2019

Related U.S. Application Data

(60) Provisional application No. 62/585,824, filed on Nov. 14, 2017.

(51) Int. Cl.
*H01M 10/44* (2006.01)
*H01M 10/46* (2006.01)
(Continued)

(52) U.S. Cl.
CPC ......... *H02J 7/0019* (2013.01); *H01M 10/482* (2013.01); *H02J 7/0016* (2013.01);
(Continued)

(58) Field of Classification Search
CPC ....... H02J 7/0013; H02J 7/0014; H02J 7/0016
(Continued)

(56) References Cited

U.S. PATENT DOCUMENTS 9,197,081 B2 * 11/2015 Finberg ................. H02J 7/0016
9,455,580 B2    9/2016 Mao et al.
(Continued)

FOREIGN PATENT DOCUMENTS

CN     103683396 A    3/2014
WO       9622625 A1   7/1996

OTHER PUBLICATIONS

International Search Report; PCT/US2018/060871; dated Mar. 7, 2019; 6 pages.

*Primary Examiner* — Edward Tso
(74) *Attorney, Agent, or Firm* — Dickinson Wright PLLC

(57) ABSTRACT

A system and method for cell balancing within a battery module includes local sensing and switching at each of the battery cells. A switching circuit is associated with each one of the battery cells to connect or functionally disconnected the battery cell from the battery module. A module controller generates one or more parameter threshold values as maximum operating values for each of the battery cells. Each cell has a cell controller associated therewith to monitor one or more cell parameters, which are communicated to a summing module via a shared monitoring line, averaged, and communicated to the module controller. The cell controllers each receive a parameter threshold value via a shared control line and command the associated switching circuit to functionally disconnect and to bypass the battery cell if the cell parameter exceeds the corresponding parameter threshold value. Methods of checking the battery module are also provided.

18 Claims, 7 Drawing Sheets

(51) Int. Cl.
*H02J 7/00* (2006.01)
*H01M 10/48* (2006.01)
*H02J 7/24* (2006.01)

(52) U.S. Cl.
CPC .......... *H02J 7/0018* (2013.01); *H02J 7/0026* (2013.01); *H02J 7/24* (2013.01)

(58) Field of Classification Search
USPC .......................... 320/116, 117, 118, 119, 122
See application file for complete search history.

(56) References Cited

U.S. PATENT DOCUMENTS

| | | |
|---|---|---|
| 2008/0090133 A1 | 4/2008 | Lim et al. |
| 2012/0091964 A1 | 4/2012 | Vance et al. |
| 2012/0119709 A1 | 5/2012 | Mull et al. |
| 2013/0249317 A1 | 9/2013 | Kang et al. |
| 2014/0035532 A1 | 2/2014 | Manfred et al. |
| 2016/0043579 A1 | 2/2016 | Finberg et al. |

* cited by examiner

CELL BALANCING WITH LOCAL SENSING AND SWITCHING

CROSS REFERENCE TO RELATED APPLICATION

This application claims the benefit of U.S. provisional patent application Ser. No. 62/585,824, filed Nov. 14, 2017, the contents of which are incorporated herein by reference in their entirety.

BACKGROUND OF THE INVENTION

1. Field of the Invention

A system for a cell balancing with local sensing and switching in a multi-cell battery module.

2. Description of the Prior Art

It is well known that variability in electrical properties of individual cells can limit a battery's overall performance. This is particularly true in batteries with a high cell count. Typically, the performance of the battery is limited to the performance of the weakest cell. Each cell's performance can be measured with parameters such as total voltage under load, temperature under load, charge storage capability, internal impedance, dynamic charge mobility and others.

For example, the peak current flow in a series-connected group of cells is limited by the internal impedance of the cell with the highest internal impedance due to heat buildup. In another example, the total charge available in a series-connected group of cells is limited by the charge storage of the weakest cell. In these cases and others (similar results for parallel connected cells and voltage matching . . . ), the battery's overall performance can be improved by balancing the currents and voltages of all cells in the battery or the battery module.

Traditional approaches for balancing battery cells within a battery module include shunt resistors (also known as resistor bleed balancing), recharge current modulation responsive to individual cell voltage, and switched current pumps to move charge from one cell to another. However, each of those traditional approaches has associated disadvantages. Resistor bleed balancing dissipates extra charge in high performing cells until low performing cells are charged. In this approach, a significant amount of energy can be dissipated as heat in the shunt resistor. Recharge current modulation can be more efficient, but current implementations require numerous wire connections to each cell. Charge pumping is potentially very efficient, but does not scale up to batteries with a high cell count due to excessive wiring requirements.

SUMMARY OF THE INVENTION

The invention provides for a system and method for cell balancing with local sensing and switching. The system comprises a battery module including a plurality of battery cells connected in a series configuration, with each of the battery cells having a switched cell terminal and a non-switched cell terminal.

The system of the present disclosure includes one or more switching circuits, each configured to switch an associated one of the battery cells in the battery module. Each of the switching circuits is switchable between a first mode with the associated battery cell being in-service with the battery module, and a second mode with the associated battery cell being functionally disconnected from service in the battery module. Each of the switching circuits includes a first switch configured as a closed circuit in the first mode to allow a flow of electrical current between the switched cell terminal of the associated battery cell and a module node. The first switch is also configured as an open circuit in the second mode to block the flow of electrical current between the switched cell terminal and the module node. Each of the switching circuits also includes a cell bypass conductor in electrical contact with the non-switched cell terminal of the associated battery cell. Each of the switching circuits also includes a second switch configured as an open circuit in the first mode to block a flow of electrical current between the cell bypass conductor and the module node. The second switch is also configured as a closed circuit in the second mode to allow the flow of electrical current between the cell bypass conductor and the module node.

The system of the present disclosure also includes a cell controller associated with each of the switching circuits. Each of the cell controllers is configured to monitor a cell parameter of the of the associated battery cell and to cause the switching circuit to change from the first mode to the second mode in response to the cell parameter exceeding a corresponding parameter threshold value.

According to an aspect of the disclosure, each of the battery cells in the battery module may be an associated battery cell having a switching circuit associated therewith.

According to another aspect of the disclosure, each of the cell controllers may include a threshold input terminal for receiving an input signal corresponding to the parameter threshold value. Each of the cell controllers may also include a shared control line in electrical communication with a module controller and with the threshold input terminal of each of the cell controllers to communicate the parameter threshold value therebetween.

According to another aspect of the disclosure, the parameter threshold value may be one of two or more parameter threshold values. The threshold input terminal of each of the cell controllers may be one of two or more threshold input terminals of each of the cell controllers. Furthermore, the shared control line may be one of two or more shared control lines, with each of the shared control lines being in electrical communication with the module controller and with a corresponding one of the threshold input terminals of each of the cell controllers, and with each of the shared control lines communicating a corresponding one of the parameter threshold values.

According to another aspect of the disclosure, the system may include a parameter output terminal on each of the cell controllers for providing an output signal corresponding to at least one of the cell parameters. The system may also include a shared monitoring line in electrical communication with each of the cell controllers to communicate the cell parameter or cell parameters from each of the cell controllers to a common destination.

According to another aspect of the disclosure, the shared monitoring line may be one of two or more shared monitoring lines, with each of the shared monitoring lines being in electrical communication with each of the cell controllers and the common destination.

According to another aspect of the disclosure, the shared monitoring line may be configured to communicate a plurality of the cell parameters. In one embodiment, the plurality of the cell parameters may be communicated at different times over the shared monitoring line. In some embodiments, the plurality of the cell parameters may be communicated concurrently over the shared monitoring line. In one embodiment, each of the plurality of the cell parameters may be associated with a different carrier frequency.

According to another aspect of the disclosure, the cell parameter may be selected from a group comprising: a cell heat flux, a cell current, a cell state of charge, a cell temperature, and a cell voltage.

According to another aspect of the disclosure, a system for cell balancing is provided, with the system comprising a battery module including a plurality of battery cells in a series configuration, and one or more switching circuits each configured to switch an associated battery cell of the plurality of battery cells between a first mode with the associated battery cell being in-service with the battery module, and a second mode with the associated battery cell being functionally disconnected from the battery module. The system also includes a cell controller associated with each of the one or more switching circuits and configured to monitor a cell parameter of the associated battery cell associated therewith and to cause the switching circuit to change from the first mode to the second mode in response to the cell parameter exceeding a corresponding parameter threshold value. The system further includes a threshold input terminal on each of the cell controllers for receiving an input signal corresponding to at least one of the parameter threshold values. The system also includes a shared control line in electrical communication with a module controller and with the threshold input terminal of each of the cell controllers to communicate the parameter threshold values therebetween.

According to an aspect of the disclosure, the system for cell balancing may also include a parameter output terminal on each of the cell controllers for providing an output signal corresponding to at least one of the cell parameters. The system may also include a shared monitoring line in electrical communication with each of the cell controllers to communicate the one of the cell parameters from each of the cell controllers to a common destination.

A method for cell balancing includes the steps of: measuring values of one or more cell parameters of each of a plurality of battery cells connected in series by a cell controller that is functionally associated with each of the battery cells; comparing by each of the cell controllers the measured value of the cell parameter to a parameter threshold value associated with each of the one or more cell parameters; and signaling by one of the cell controllers a command signal to a corresponding switching circuit to remove an associated one of the battery cells from service within the battery module in response to the measured value of any one of the cell parameters exceeding the parameter threshold value associated with a corresponding one of the cell parameters.

The method for cell balancing further includes the steps of: inhibiting an electrical current path between the associated one of the battery cells and a module node by a first switch in response to the command signal from the associated cell controller to cause the associated one of the battery cells to be functionally disconnected from service in the battery module; and establishing an electrical current path through a bypass conductor around the associated one of the battery cells by a second switch in response to the command signal from the associated cell controller to allow the battery module to function with the associated one of the battery cells being functionally disconnected from service in the battery module.

According to an aspect of the disclosure, one or more of the cell parameters may be selected from the group comprising: a cell heat flux, a cell current, a cell state of charge, a cell temperature, and a cell voltage.

The method for cell balancing may further include: receiving an input signal corresponding to the parameter threshold value at a threshold input terminal on each of the cell controllers; and communicating the parameter threshold value from a module controller to each of the cell controllers over a shared control line.

The method for cell balancing may further include: providing an output signal corresponding to the measured value of one of the one or more cell parameters on an output terminal on each of the cell controllers; and communicating the measured value of the one of the one or more cell parameters from each of the cell controllers to a common destination over a shared monitoring line.

The method for cell balancing may further include: communicating the measured values of one of the one or more cell parameters by each of the cell controllers over a shared monitoring line to a summing module; and determining an average value of the one of the one of the one or more cell parameters for the plurality of battery cells.

According to an aspect of the disclosure, the method for cell balancing may further include a first checking method for determining the condition of one or more of the battery cells within the battery module. The first checking method may comprise: setting the parameter threshold value to a relatively high value to cause most or all of the battery cells to be functionally connected to the battery module; monitoring a module voltage to determine a number of the battery cells that are functionally connected to the battery module at any given time; and progressively lowering the parameter threshold value while simultaneously monitoring the number of the battery cells that are functionally connected to the battery module to determine the impact of the parameter threshold value on the battery cells.

According to another aspect of the disclosure, the method for cell balancing may further include a second checking method for determining the condition of one or more of the battery cells within the battery module. The second checking method may comprise: setting the parameter threshold value to a predetermined value; monitoring a module voltage to determine a number of the battery cells that are functionally connected to the battery module with the parameter threshold value set to the predetermined value; and judging the relative health of the battery module based on the number of the battery cells that are functionally connected to the battery module with the parameter threshold value set to the predetermined value.

Goals of the system and method of the present disclosure include achieving accurate cell balancing, minimizing connections to individual cells and minimizing per-cell cost by distributing the functions of measurement, data sharing, computation and decision making optimally across batteries with high cell counts.

In other words, the system and method of the present disclosure provides for balancing cells by means of local sensing, threshold setting based on shared/averaged/calculated parameters, using local decision making and local cell switching. In this approach, cells are dynamically switched in or out of service depending on one or more parameters indicating the cell's state. For example, on recharge, a cell may be functionally disconnected, or "switched-out" if its voltage, temperature or heat flux indicates that the cell is fully charged. On discharge a cell may be switched-out if its voltage temperature or heat flux indicates that the cell is overloaded/overcurrent or discharged.

The system and method of the present disclosure provides several advantages over other systems in use today. It allows for a reduced cost and packaging size for cell balancing. With this reduced cost and size, cell balancing is practical in high-cell-count batteries. The concept scales to batteries with a hierarchy of connections including series, parallel and series/parallel connection schemes.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
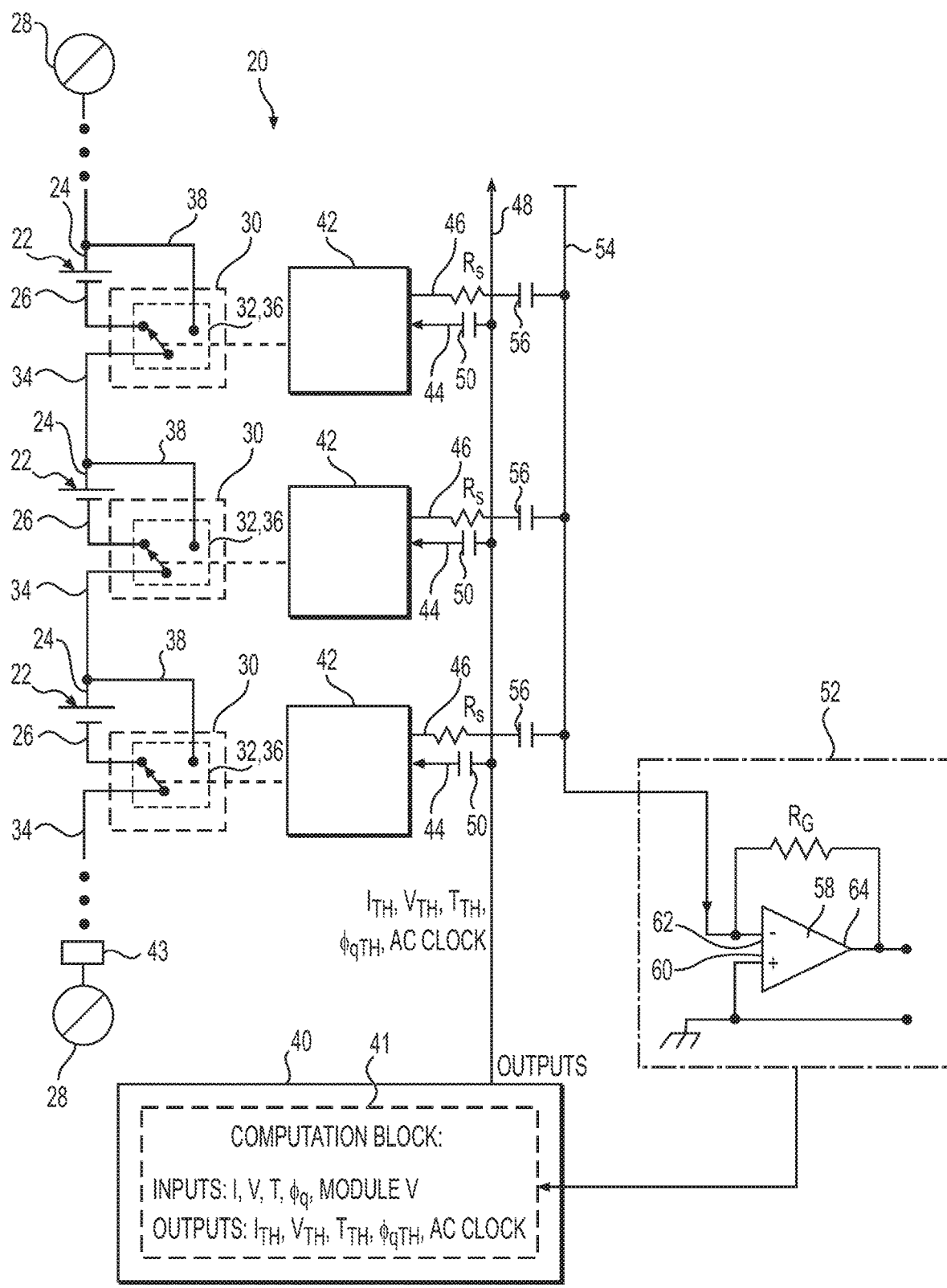
FIG. 1 is a schematic diagram illustrating a battery module with circuitry for local sensing and switching.

Referring to the Figures, wherein like numerals indicate corresponding parts throughout the several views, a system for cell balancing with local sensing and switching is provided. As shown in FIG. 1, the system includes a battery module 20 having a plurality of battery cells 22 arranged in a series configuration with a module terminal 28 at each end of the series of the battery cells 22 for charging or discharging the battery module 20. Each of the battery cells 22 as set forth in this disclosure may refer to a single electrochemical cell or to a grouping of two or more electrochemical cells connected and monitored together as a group.

Each of the battery cells 22 includes a switched cell terminal 24 and a non-switched cell terminal 26. In the example embodiment shown in FIGS. 1 and 2, the switched cell terminal 24 is the positive terminal of the battery cell 22, and the non-switched cell terminal 26 is the negative terminal of the battery cell 22. However, it should be appreciated that the switched and non-switched cell terminals 24, 26 may also be associated with terminals of the battery cell 22 having the opposite polarity. In other words, the switched cell terminal 24 may be the negative terminal of the battery cell 22 and the non-switched cell terminal 26 may be positive terminal of the battery cell 22.

A switching circuit 30 is associated with each of the battery cells 22 and is switchable between a first mode with the associated battery cell 22 being in-service with the battery module 20, and a second mode with the associated battery cell 22 being functionally disconnected from service in the battery module 20. In other words, in the first mode, the associated battery cell 22 is connected in the series circuit of the battery module 20 and is able to be charged and discharged with the battery module 20. In the second mode, the associated battery cell 22 is functionally disconnected from the series circuit of the battery module 20 and is not charged or discharged with the battery module 20.

Figure 2:
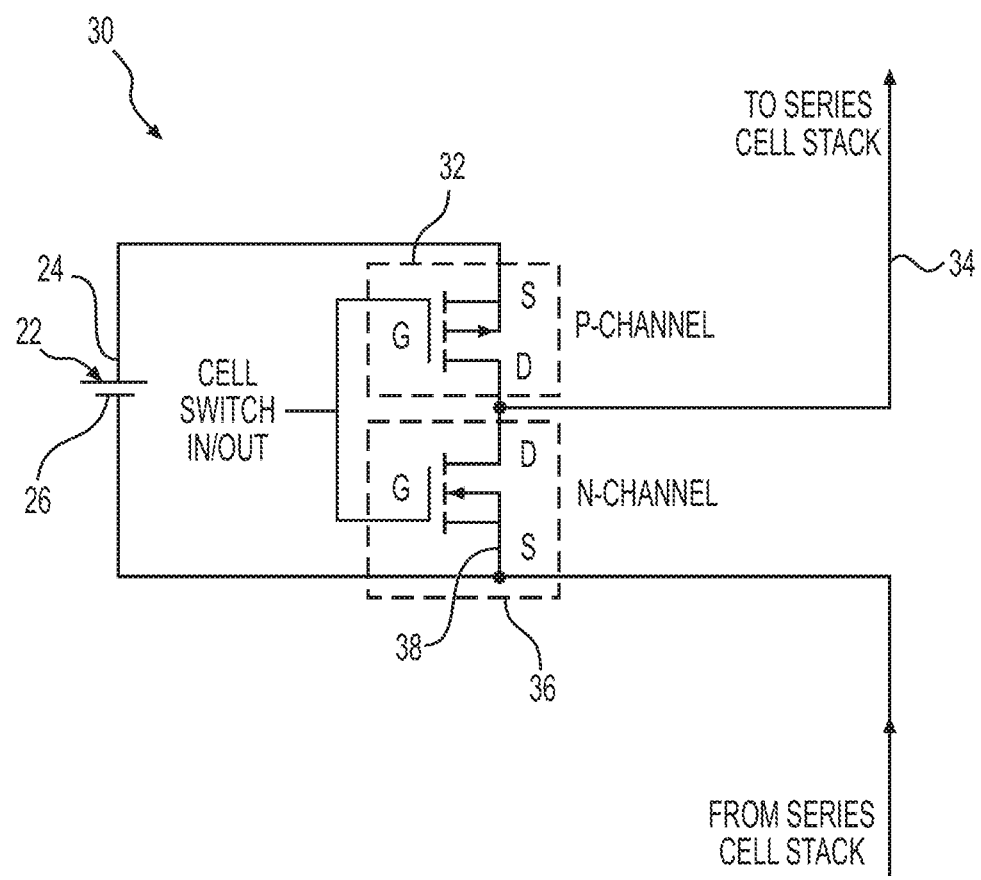
FIG. 2 is a schematic diagram illustrating a switching circuit for a battery module.
Figure 3A:
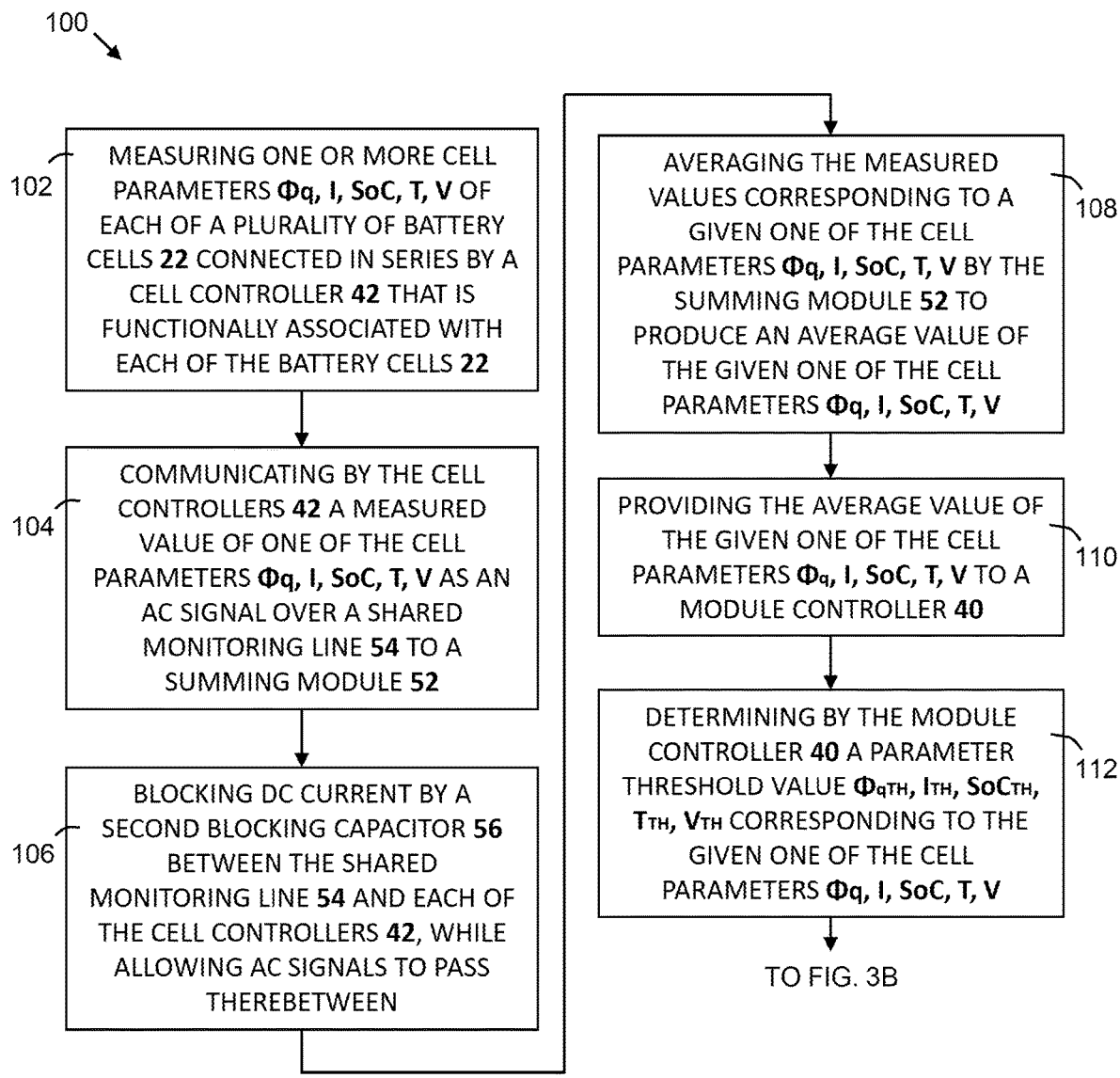
FIG. 3A is a flow chart illustrating method steps of an embodiment for cell balancing with local sensing and switching according to an aspect of the disclosure.
Figure 3B:
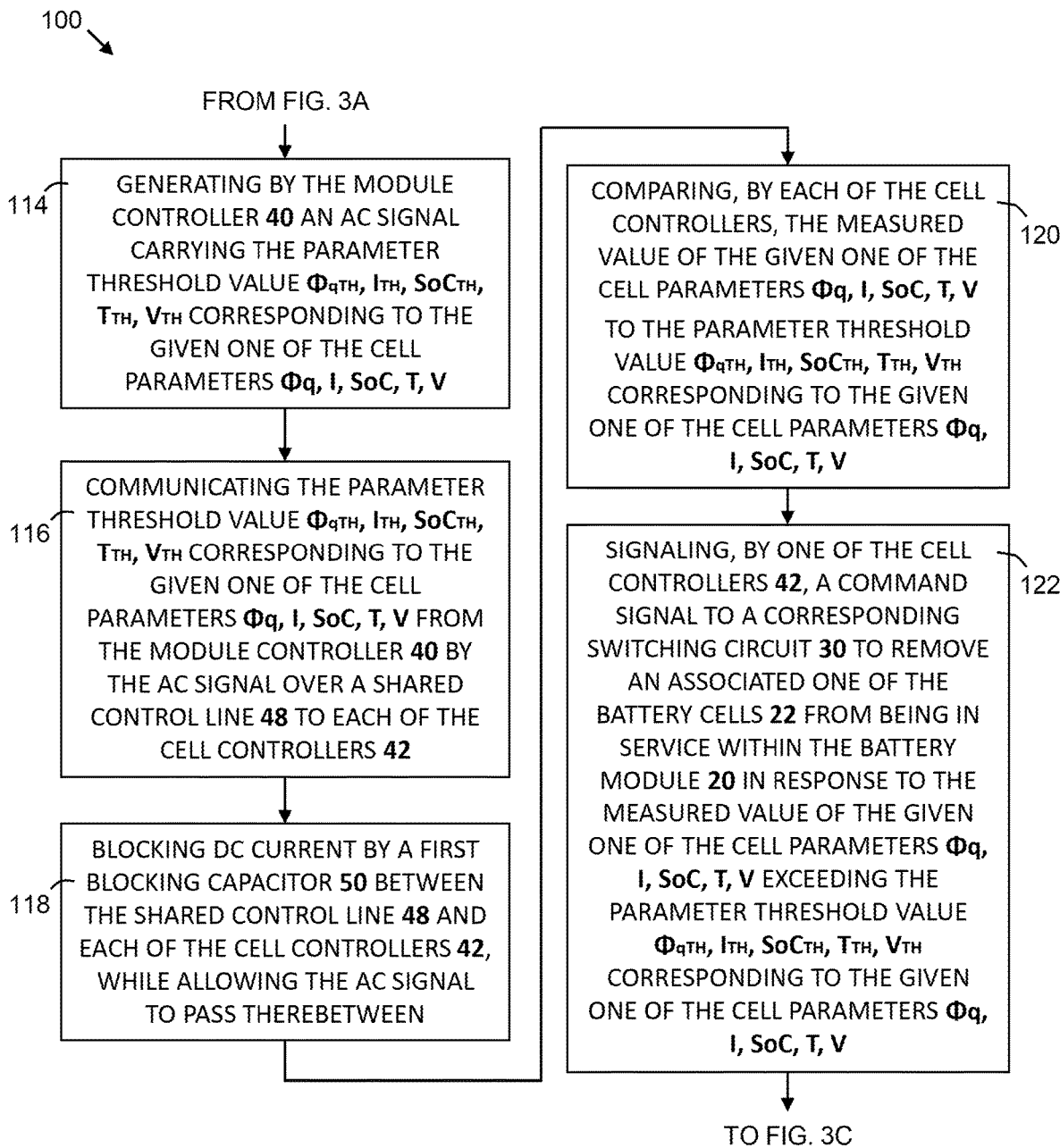
FIG. 3B is a continuation of the flow chart of FIG. 3A.
Figure 3C:
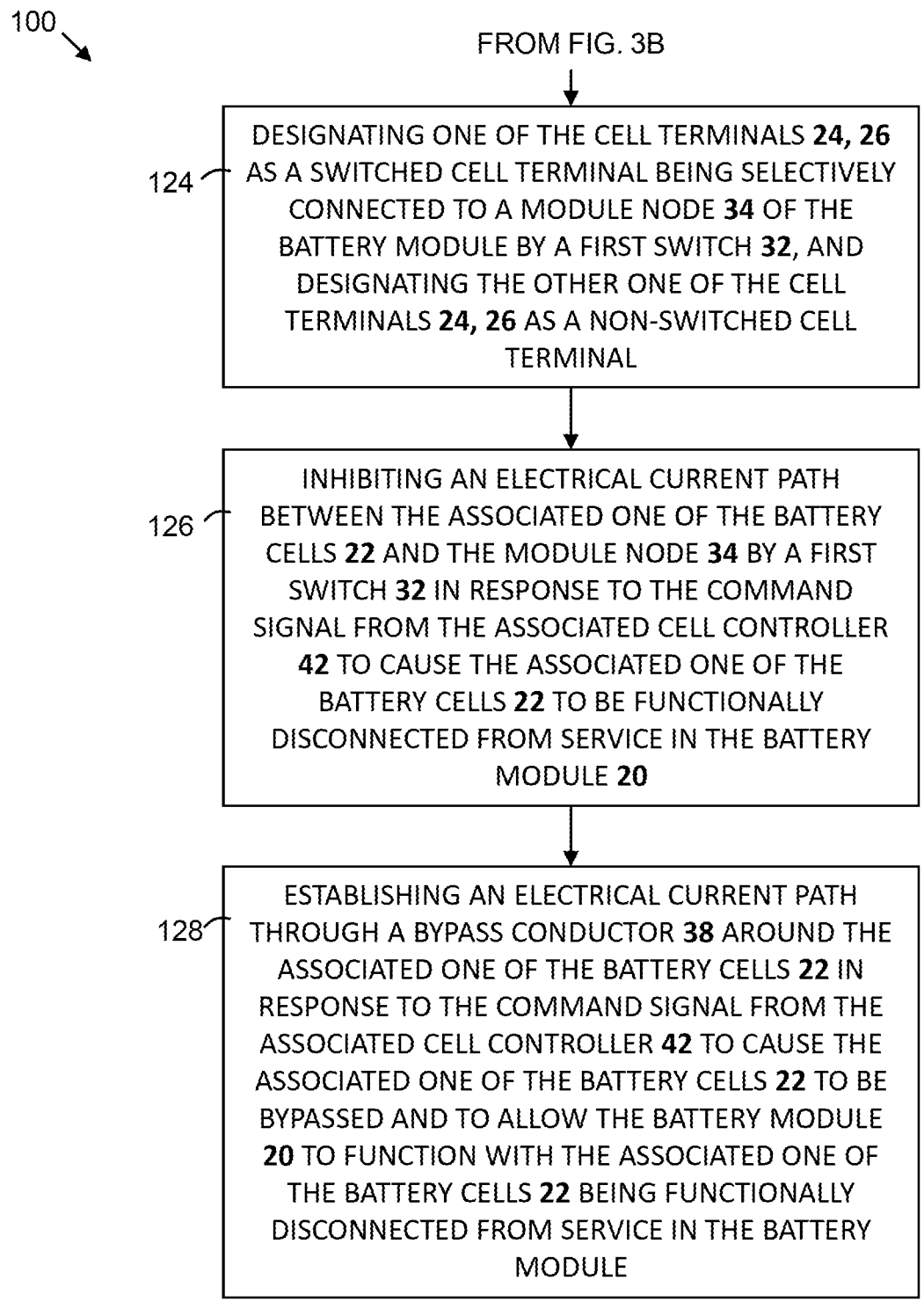
FIG. 3C is a further continuation of the flow chart of FIG. 3A.
Figure 4:
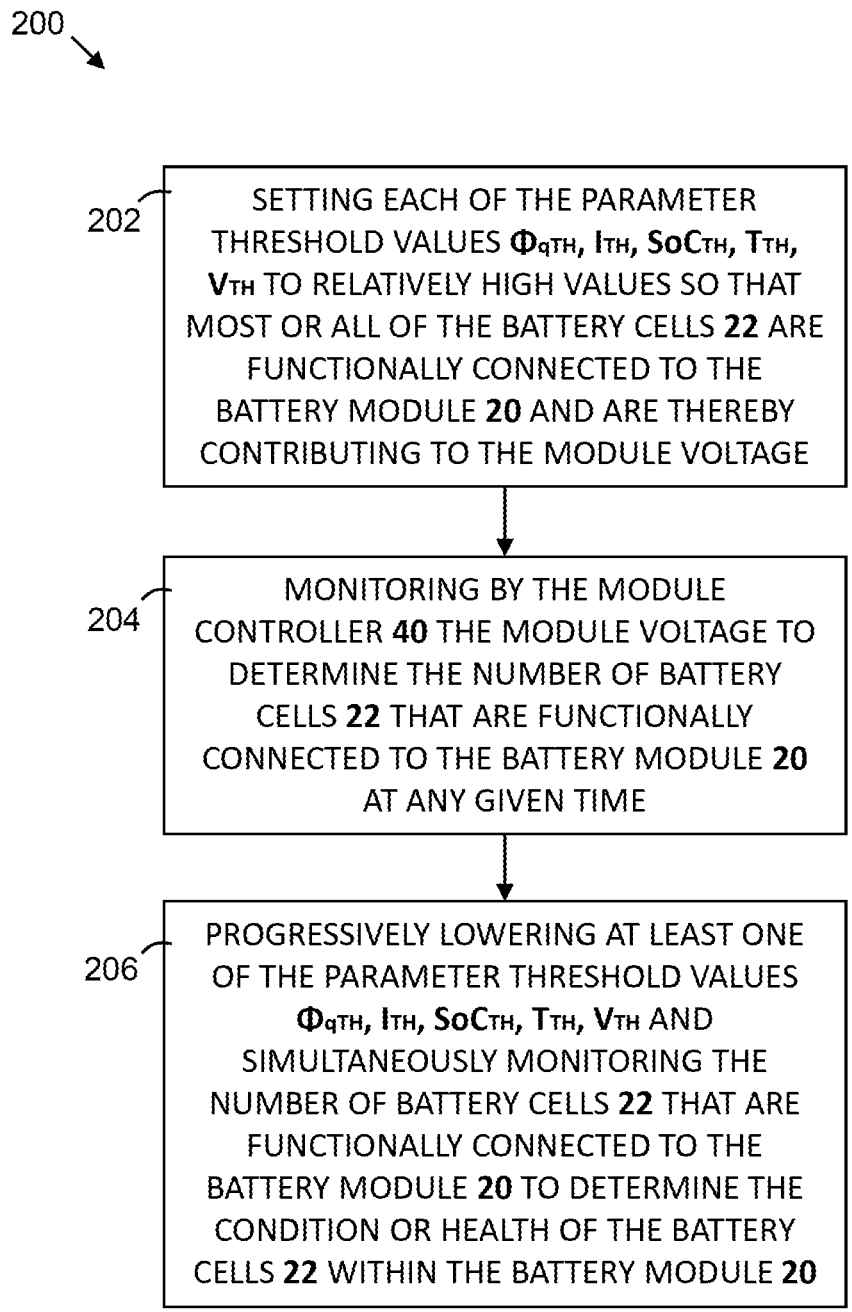
FIG. 4 is a flow chart illustrating method steps for a checking method according to an aspect of the disclosure.
Figure 5:
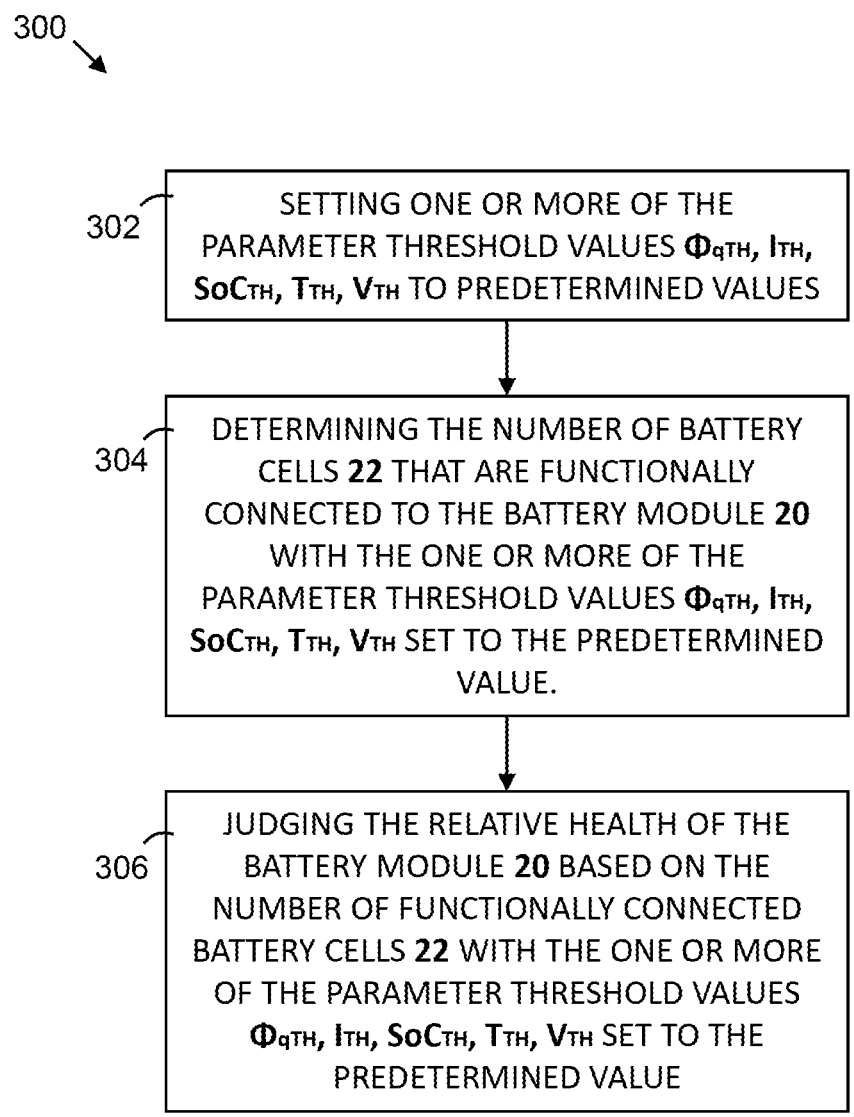
FIG. 5 is a flow chart illustrating method steps for an alternative checking method according to an aspect of the disclosure.

As shown in FIG. 1 and detailed in FIG. 2, the switching circuit 30 includes a first switch 32 in electrical communication with the switched cell terminal 24. The first switch 32 is configured as a closed circuit in the first mode to allow a flow of electrical current between the switched cell terminals 24 and a module node 34 in electrical contact with one of the module terminals 28 or one of the cell terminals 24, 26 of another one of the battery cells 22. The first switch 32 is also configured as an open circuit in the second mode to block the flow of electrical current between the switched cell terminal 24 and the module node 34. The first switch 32, therefore, operates to selectively connect or disconnect the associated battery cell 22 from the battery module 20.

The switching circuit 30 also includes a cell bypass conductor 38 in electrical contact with the non-switched cell terminal 26, and a second switch 36 configured in the first mode as an open circuit to block the flow of electrical current between the cell bypass conductor 38 and the module node 34. The second switch 36 is configured as a closed circuit in the second mode to allow the flow of electrical current between the cell bypass conductor 38 and the module node 34. The second switch 36, therefore, operates to selectively enable the cell bypass conductor 38 to conduct electrical current that bypasses the associated battery cell 22 in the second mode, thereby allowing the battery module 20 to continue to function and to be charged and/or discharged, with the associated battery cell 22 functionally disconnected therefrom.

The switches 32, 36 may take the form of P-channel and N-Channel enhancement mode metal-oxide-semiconductor field-effect transistors (MOSFETS) as shown in FIG. 2; however, other types of switching devices may be used including different types of transistors, such as field effect transistors (FETs), bipolar junction transistors (BJTs) including insulated gate bipolar transistors (IGBTs), or contacts such as those in an electromechanical relay. Preferably, and to avoid causing a short circuit condition of the battery cell 22, the switches 32, 36 should have a break-before-make arrangement, which may be implemented as Form-C contacts as shown in FIG. 1. The combination of the two switches 32, 36 with a shared control input to place an output into one of two different defined states, each based on electrical communication with a corresponding circuit node may be called a "totem pole configuration."

As shown in FIG. 1, the system also includes a module controller 40 common to the battery module 20 and operable to provide one or more parameter threshold values $\Phi_{qTH}$, $I_{TH}$, $SoC_{TH}$, $T_{TH}$, $V_{TH}$ including a heat flux threshold $\Phi_{qTH}$, a current threshold $I_{TH}$, a state of charge threshold $SoC_{TH}$, a temperature threshold $T_{TH}$, and a voltage threshold $V_{TH}$, as maximum operating values for operation of the battery cells 22 within the battery module 20. The module controller 40 may include circuitry to measure the electrical current in in the module, the module voltage, which is the voltage between the module terminals 28, and/or other parameters.

According to an aspect, the module controller 40 may also provide for management of the battery module 20 as a whole by observing changes to the module voltage and/or current indicating that one or more of the battery cells 22 have been switched out. During recharge or offline conditions, the population of battery cells 22 can be assessed by slowly modulating one of the shared parameter threshold values $\Phi_{qTH}$, $I_{TH}$, $SoC_{TH}$, $T_{TH}$, $V_{TH}$ and observing cell switching activity. This produces a histogram of cell population versus the parameter of interest.

According to an aspect, the system may provide for an initial calibration of the battery module 20. For example, after initial assembly, the computation block 41 may calculate and store, or may be given a histogram of individual cell performance for comparison to results when the battery is in service. This is useful to observe in-use changes or degradation in the battery cells 22.

According to a further aspect, the system may provide for ancillary system diagnosis. For example, measurements of individual cell parameters $\Phi_q$, I, SoC, T, V, when combined properly, may be used to monitor, predict and diagnose problems in ancillary systems such as the thermal management system, module voltage measurement system, module current measurement system.

The system also includes a cell controller 42 associated with each of the battery cells 22 to monitor one or more of a plurality of cell parameters $\Phi_q$, I, SoC, T, V including a cell heat flux $\Phi_q$, a cell current I, a cell state of charge SoC, a cell temperature T, and a cell voltage V, and to cause the switching circuit 30 to change from the first mode to the second mode in response to any of the cell parameters $\Phi_q$, I, SoC, T, V exceeding a corresponding parameter threshold value $\Phi_{qTH}$, $I_{TH}$, $SoC_{TH}$, $T_{TH}$, $V_{TH}$. The cell controller 42 may include a time delay before causing the switching circuit 30 to change from the first mode to the second mode to allow for things such as anomalous readings or for transient spikes in the value of one of the cell parameters $\Phi_q$, I, SoC, T, V, such as, for example, a current spike due to switching a non-linear load into service. In other words, the cell controller 42 monitors at least one of the cell parameters $\Phi_q$, I, SoC, T, V, and directs the switching circuit 30 to functionally disconnect the associated battery cell 22 from the battery module 20 if a monitored cell parameter $\Phi_q$, I, SoC, T, V exceeds the value of the associated parameter threshold. For example, if the temperature threshold $T_{TH}$ is 90° Celsius, then the cell controller 42 would allow the associated cell to be electrically connected in the series circuit of the battery module 20 until and unless the cell temperature T exceeds the temperature threshold $T_{TH}$ of 90° Celsius. If the cell temperature T exceeds the temperature threshold $T_{TH}$ of 90° Celsius, the cell controller 42 would cause the switching circuit 30 to disconnect the cell from the series circuit of the battery module 20, and to direct electrical current through the cell bypass conductor 38, thereby allowing the battery module 20 to continue to function (but with a reduced capacity as a result of the of the battery cell 22 being functionally disconnected).

In cases where the battery cell 22 is part of a series circuit, a functionally disconnected and bypassed battery cell 22 would result in a reduced voltage of the whole series circuit. In other words, for a battery module 20 that is arranged as a series circuit, switching one of the constituent battery cells 22 to a functionally disconnected and bypassed condition would result in the battery module 20 having a reduced module voltage which would be reduced by the voltage that had been provided by that constituent battery cell 22. According to an aspect, the cell controller 42 may function to cause the switching circuit 30 to change back from the second mode to the first mode in response to the cell parameters $\Phi_q$, I, SoC, T, V each being below the corresponding parameter threshold value $\Phi_{qTH}$, $I_{TH}$, $SoC_{TH}$, $T_{TH}$, $V_{TH}$. This may include the use of some separation, such as a deadband and/or delay timer to prevent rapid switching in case any of the cell parameters $\Phi_q$, I, SoC, T, V are equal to or oscillate about their corresponding parameter threshold value $\Phi_{qTH}$, $I_{TH}$, $SoC_{TH}$, $T_{TH}$, $V_{TH}$. Alternatively, the cell controller 42 may cause the switching circuit 30 to remain in the second mode until a predetermined condition is satisfied, such as the receipt of a reset signal or the occurrence of an event such as a recharging cycle or the passage of a predetermined period of time. The cell controller 42 may also use deadband values and/or time delays to prevent the switching circuit 30 from rapidly cycling between modes.

Each of the cell controllers 42 may be may be implemented with analog discrete components, an analog IC, a digital IC or a combination of these. Because the system requires numerous cell controllers 42, they are most advantageously made inexpensively. In other words, it is economically advantageous to minimize the complexity and cost of the cell controllers 42.

The cell heat flux $\Phi_q$ may be, for example, the differential temperature across parts of the battery cell 22, differential temperature of cooling water across a chiller plate thermally connected to the battery cell 22, or a product of current and voltage in thermoelectric thermal management device. The cell heat flux $\Phi_q$ may be measured in one or more of several different ways including, for example, with a thin thermopile-type heat flux sensor (such as a Hukseflux FHF01) between the battery cell 22 and a chiller plate; as the difference between the surface temperature of the battery cell 22 at the chiller plate and a core temperature of the battery cell 22 (at equilibrium); as the difference between an input coolant temperature vs. an output coolant temperature to/from a chiller plate (at equilibrium); or using voltage and/or current of a thermoelectric thermal management device to establish a temperature equilibrium. For the heat flux measurements where a significant thermal mass is involved ("at equilibrium" above), a bulk temperature measurement and mathematical model of the thermal mass between the temperature measurements can calculate the heat flux during non-equilibrium conditions.

With the battery module 20 being a series combination of battery cells 22, the cell current I, for each of the battery cells 22 functionally connected to the battery module 20 is equal to the module current. Therefore, only a single current sensor 43 is needed for the entire battery module. For battery modules 20 having two or more parallel connected branches, a corresponding number of current sensors 43 would be required to sense the electrical current through the battery cells 22 in each of the branches.

The cell state of charge SoC, which may also be called accumulated charge, may be determined by integrating the charge in or out of the cell to create an accumulated charge indicator. This may be accomplished by either an analog or digital circuit. An integrator reset may be triggered by global or local conditions to recalibrate the cell state of charge SoC.

The cell temperature T may be measured by the cell controller 42 using a shift in device characteristics such as diode forward bias or diode leakage (dark) current. Other temperature measurement devices and circuits may also be used such as, for example, a thermocouple or resistance temperature detector (RTD) mounted to or near the battery cell. The cell voltage V are preferably measured by the cell controller 42 using isolated gate or reverse biased devices that have very low current draw to cause a measurable change in device characteristics.

As shown in FIG. 1, each of the cell controllers 42 includes a threshold input terminal 44 for receiving an input signal corresponding to at least one of the parameter threshold values $\Phi_{qTH}$, $I_{TH}$, $SoC_{TH}$, $T_{TH}$, $V_{TH}$. Each of the cell controllers 42 also includes a parameter output terminal 46 for providing an output signal corresponding to at least one of the cell parameters $\Phi_q$, I, SoC, T, V.

The system also includes a shared control line 48 in electrical communication with the module controller 40 and with the threshold input terminal 44 of each of the cell controllers 42 to communicate the parameter threshold values $\Phi_{qTH}$, $I_{TH}$, $SoC_{TH}$, $T_{TH}$, $V_{TH}$ and an AC clocking signal from the module controller 40 to each of the cell controllers 42. A first blocking capacitor 50 is disposed between the shared control line 48 and each of the threshold input terminals 44 for blocking DC current from flowing therebetween while allowing AC signals to pass.

As shown in FIG. 1, a summing module 52 is in electrical communication with the module controller 40 and with a plurality of the cell controllers 42 to provide the module controller 40 with an average value of one of the cell parameters $\Phi_q$, I, SoC, T, V based on a plurality of values of the one of the cell parameters $\Phi_q$, I, SoC, T, V from the connected plurality of the cell controllers 42. The system may include two or more summing modules 52, with each providing an average value of an associated one of the cell parameters $\Phi_q$, I, SoC, T, V. The summing modules 52 may take the form of hardware, software, or a combination of hardware and software which may be located within the module controller 40. Alternatively, a single summing module 52 may provide average values of two or more of the cell parameters $\Phi_q$, I, SoC, T, V such as, for example, where two or more of the cell parameters $\Phi_q$, I, SoC, T, V are communicated at different times. In other words, the module controller 40 may perform the task of summing and/or averaging the values of one or more of the cell parameters.

The module controller 40 includes a computation block 41 to compute the one or more parameter threshold values $\Phi_{qTH}$, $I_{TH}$, $SoC_{TH}$, $T_{TH}$, $V_{TH}$. The computation block 41 may take one or more of the average values of the cell parameters $\Phi_q$, I, SoC, T, V as provided by the summing modules 52 as inputs. The computation block 41 may also take as inputs other values such as, for example, the module voltage, or the module current. The computation block 41 may be implemented with a microcontroller having adequate I/O, computation power and environmental operating range. Alternatively or additionally, the computation block 41 may be implemented using an application-specific device, such as an application-specific integrated circuit (ASIC). The computation block 41 may be a component or a module of another device, such as a combined controller for several battery modules 20 in a multi-module battery pack.

The computation block 41 and the summing module 52 may be functionally combined and may each be implemented in software. Such software implementations of the computation block 41 and the summing module 52 may run on the same processor or controller, such as the module controller 40. Alternatively, software implementations of the computation block 41 and the summing module 52 may run on different processors or controllers. The module controller 40 may include one of the different processors or controllers implementing either or both of the computation block 41 and the summing module 52. Additionally or alternatively, one or more of the computation block 41 and/or the summing module 52 may communicate with the The system also includes a shared monitoring line 54 in electrical communication with each of the cell controllers 42 to communicate the one of the cell parameters $\Phi_q$, I, SoC, T, V from each of the cell controllers 42 to a common destination. In the embodiment illustrated in FIG. 1, the common destination is the summing module 52, which receives the one of the cell parameters $\Phi_q$, I, SoC, T, V from each of the cell controllers 42. A second blocking capacitor 56 is disposed between the shared monitoring line 54 and each of the cell controllers 42 for blocking DC current from flowing therebetween while allowing AC signals to pass. A signal resistor $R_s$ is disposed between each of the cell controllers 42 and the shared monitoring line 54 for limiting the flow of electrical current therebetween. The use of the summing module 52 to accept two or more of the cell parameters $\Phi_q$, I, SoC, T, V together on the same shared monitoring line 54 may be referred to as a "party-line summer" method of determining the average of the one of the cell parameters $\Phi_q$, I, SoC, T, V. The blocking capacitors 50, 56 together provide DC isolation to the cell module 42, to prevent high voltage DC from being transferred to the respective shared line 48, 54. The value and rating of the blocking capacitors 50, 56 must be selected to perform that isolation while allowing the AC signals to pass through with minimal attenuation.

In an embodiment illustrated in FIG. 1, the summing module 52 includes an operational amplifier 58 configured as an inverting op-amp with a non-inverting input 60 connected to a ground reference voltage and with an inverting input 62 in electrical contact with the shared monitoring line 54 and with a summing resistor RG connected between the inverting input 62 and an output terminal 64 thereof to generate an output voltage Vout proportional to the sum of the voltages of each of the parameter output terminals 46 in communication with the shared monitoring line 54. In this way, the summing module 52 also functions to average the values of the associated cell parameter from each of the cell controllers 42.

According to an aspect, the module controller 40 may generate one or more of the parameter threshold values $\Phi_{qTH}$, $I_{TH}$, $SoC_{TH}$, $T_{TH}$, $V_{TH}$ in response to the average value of the corresponding cell parameter $\Phi_q$, I, SoC, T, V. For example, the module controller 40 may be configured to generate a temperature threshold $T_{TH}$ that is 10% above the average cell temperature T, so an average cell temperature T of 60° Celsius would cause the temperature threshold $T_{TH}$ to be 66° Celsius. These average-based parameter threshold values $\Phi_{qTH}$, $I_{TH}$, $SoC_{TH}$, $T_{TH}$, $V_{TH}$ may be limited to predetermined absolute maximum or minimum threshold values. For example, the temperature threshold value $T_{TH}$ may be set to the lesser of 10% above the average of the measured cell temperatures T, or 90° Celsius, where 90° Celsius is an example maximum threshold temperature.

According to an aspect, one or more of the parameter threshold values $\Phi_{qTH}$, $I_{TH}$, $SoC_{TH}$, $T_{TH}$, $V_{TH}$ may be set based on averages of measured parameters of adjacent ones of the battery cells 22 which are subject to the same current loading and thermal management. For the voltage threshold $V_{TH}$, this can be determined by the overall stack voltage divided by the number of battery cells 22 that are functionally connected to that stack at any given time. For the temperature threshold $T_{TH}$, this can be a group temperature indicator such as an exit coolant flow or bulk heat-sink temperature. For the heat flux threshold $\Phi_{qTH}$, this can be calculated from coolant flow and temperature rise in a fluid cooled thermal management system. For the heat flux threshold $\Phi_{qTH}$, this can also be calculated from the impedance, or current and voltage of thermoelectric cooling devices.

According to an aspect, the cell parameters $\Phi_q$, I, SoC, T, V and/or the parameter threshold values $\Phi_{qTH}$, $I_{TH}$, $SoC_{TH}$, $T_{TH}$, $V_{TH}$ may be communicated using one of several different encoding schemes such as, for example, by modulating a carrier frequency with a varying amplitude, phase, or frequency. The cell parameters $\Phi_q$, I, SoC, T, V and/or the parameter threshold values $\Phi_{qTH}$, $I_{TH}$, $SoC_{TH}$, $T_{TH}$, $V_{TH}$ may also be communicated by varying the duty cycle of the signal. According to a preferred embodiment, the module controller 40 may generate one threshold value $\Phi_{qTH}$, $I_{TH}$, $SoC_{TH}$, $T_{TH}$, $V_{TH}$ as an AC waveform having a predetermined frequency and with an amplitude that corresponds to the value of the signal. For example, a predetermined frequency of 30 MHz may be used, along with an encoding of 0-10 VAC corresponding to temperature threshold $T_{TH}$ range of 0-100° Celsius. For a temperature threshold $T_{TH}$ of 85° Celsius, the module controller 40 would provide an AC signal of 30 MHz and 8.5 V (RMS) on the shared control line 48.

According to a further aspect, the cell controller 42 may modulate or otherwise modify the common threshold value signal in response to the measured value of the associated cell parameter $\Phi_q$, I, SoC, T, V to communicate the value of the associated cell parameter $\Phi_q$, I, SoC, T, V on the shared monitoring line 54. Such an arrangement would have the advantageous result of synchronizing the cell parameter $\Phi_q$, I, SoC, T, V value signals from each of the cell controllers 42 connected to the same shared monitoring line 54, allowing for a relatively simple summing module 52, such as the one shown in FIG. 1. In other words, the cell controller 42 may modulate the amplitude of the received threshold value $\Phi_{qTH}$, $I_{TH}$, $SoC_{TH}$, $T_{TH}$, $V_{TH}$ according to the measured value of the cell parameter $\Phi_q$, I, SoC, T, V. The summing module 52 is used to determine average values of one or more of the measured cell parameters $\Phi_q$, I, SoC, T, V from the battery cells 22 in the battery module 20. Those average values are provided to the computation block 41 for use in generating the threshold values $\Phi_{qTH}$, $I_{TH}$, $SoC_{TH}$, $T_{TH}$, $V_{TH}$.

Cell switching may be synchronized to other events in the battery module 20 using the threshold value AC signal as a clock. For example, switching events by the switching circuits 30 may be synchronized to the zero-crossing of the AC threshold signal.

The system may include a separate shared monitoring line 54 associated with each of the cell parameters $\Phi_q$, I, SoC, T, V and a separate shared control line 48 associated with each of the parameter threshold values $\Phi_{qTH}$, $I_{TH}$, $SoC_{TH}$, $T_{TH}$, $V_{TH}$. Alternatively, the system may also be configured to communicate two or more of the cell parameters $\Phi_q$, I, SoC, T, V on the shared monitoring line 54 by communicating the cell parameters $\Phi_q$, I, SoC, T, V values at different times. Alternatively, the system may be configured to concurrently communicate two or more of the cell parameters $\Phi_q$, I, SoC, T, V on the shared monitoring line 54, such as, for example, by using different AC carrier frequencies associated with each of the cell parameters. Likewise, the system may communicate two or more of the parameter threshold values $\Phi_{qTH}$, $I_{TH}$, $SoC_{TH}$, $T_{TH}$, $V_{TH}$ on a common shared control line 48.

The AC carrier frequency or frequencies used for communicating the cell parameters $\Phi_q$, I, SoC, T, V and/or the parameter threshold values $\Phi_{qTH}$, $I_{TH}$, $SoC_{TH}$, $T_{TH}$, $V_{TH}$ may be any suitable frequency or range of frequencies. It is generally advantageous to operate with frequencies that are relatively free of noise for any given application. The frequency of the AC signaling is chosen to be well out of band of the primary current switching in the battery. This is done to minimize interference between primary current switching and cell threshold and cell parameter signals. Variable frequency drives and other such power electronic devices, such as those commonly employed for driving electric motors in vehicular applications can produce substantial RF noise in the range of 30 kHz to 1.0 MHz. In such applications it would be advantageous to use carrier frequencies outside of that range. According to a preferred embodiment, a carrier frequency may be in the rage of 30 MHz.

In summary, the system provides for local decision making at each of the battery cells 22 by a cell controller 42 which compares one or more cell parameters $\Phi_q$, I, SoC, T, V to a shared parameter threshold value or values $\Phi_{qTH}$, $I_{TH}$, $SoC_{TH}$, $T_{TH}$, $V_{TH}$ to determine when any given battery cell 22 should be switched-in (functionally connected) or switched out (bypassed). In other words, a comparison between a value of one the cell parameters $\Phi_q$, I, SoC, T, V of a battery cell 22 and a corresponding shared parameter threshold value $\Phi_{qTH}$, $I_{TH}$, $SoC_{TH}$, $T_{TH}$, $V_{TH}$ determines whether that battery cell 22 should be functionally connected or bypassed. This comparison may involve one or more of the parameters mentioned above. The system also provides for local switching at each of the battery cells 22 by a switching circuit 30 to locally isolate any of the battery cells 22 from a series-connected stack with a break-before-make switch arrangement that maintains the series stack current conduction when the cell is switched out. Furthermore, the system provides for locally isolating the battery cell 22 from a series-connected stack with a switch 32, 36. For example, as illustrated in FIG. 2, this can be implemented using a totem pole MOSFET configuration.

A method 100 for balancing battery cells with local sensing and switching is also disclosed. The method 100 begins with the step of 102 measuring one or more cell parameters $\Phi_q$, I, SoC, T, V of each of a plurality of battery cells 22 connected in series by a cell controller 42 that is functionally associated with each of the battery cells 22.

The method 100 includes 104 communicating by the cell controllers 42 a measured value of one of the cell parameters $\Phi_q$, I, SoC, T, V as an AC signal over a shared monitoring line 54 to a summing module 52.

The method 100 also includes 106 blocking DC current by a second blocking capacitor 56 between the shared monitoring line 54 and each of the cell controllers 42, while allowing AC signals to pass therebetween.

The method 100 proceeds with the step of 108 averaging the measured values corresponding to a given one of the cell parameters $\Phi_q$, I, SoC, T, V by the summing module 52 to produce an average value of the given one of the cell parameters $\Phi_q$, I, SoC, T, V.

The method 100 also includes 110 providing the average value of the given one of the cell parameters $\Phi_q$, I, SoC, T, V to a module controller 40. The module controller 40 may collect average values of one or more of the cell parameters $\Phi_q$, I, SoC, T, V for all of the battery cells 22 within the battery module 20. Alternatively, the module controller 40 may collect average values of one or more of the cell parameters $\Phi_q$, I, SoC, T, V for a subset of fewer than all of the battery cells 22 within the battery module 20. The average value of the given one of the cell parameters may be transmitted by any suitable means including, for example, via a digital or an analog signal. Average values of two or more of the cell parameters $\Phi_q$, I, SoC, T, V may be transmitted to the battery module 20. The average values of two or more of the cell parameters $\Phi_q$, I, SoC, T, V may be transmitted together or separately.

The method 100 further includes 112 determining by the module controller 40 a parameter threshold value $\Phi_{qTH}$, $I_{TH}$, $SoC_{TH}$, $T_{TH}$, $V_{TH}$ corresponding to the given one of the cell parameters $\Phi_q$, I, SoC, T, V. One or more of the parameter threshold values $\Phi_{qTH}$, $I_{TH}$, $SoC_{TH}$, $T_{TH}$, $V_{TH}$ may be static, or unchanging. For example, one or more of the parameter threshold values $\Phi_{qTH}$, $I_{TH}$, $SoC_{TH}$, $T_{TH}$, $V_{TH}$ may be a predetermined threshold that is never to be exceeded, such as a voltage, current, or state of charge known to be associated with a high likelihood of damage to the battery cells 22. Alternatively or additionally, one or more of the parameter threshold values $\Phi_{qTH}$, $I_{TH}$, $SoC_{TH}$, $T_{TH}$, $V_{TH}$ may be variable. For example, one or more of the parameter threshold values may change depending on one or more conditions or modes, or to implement a checking method for determining the condition of battery cells within a battery module. Two different examples of such a checking method 200, 300 are described below.

The method 100 proceeds with the step of 114 generating by the module controller 40 an AC signal carrying the parameter threshold value $\Phi_{qTH}$, $I_{TH}$, $SoC_{TH}$, $T_{TH}$, $V_{TH}$ corresponding to the given one of the cell parameters $\Phi_q$, I, SoC, T, V.

The method 100 also includes 116 communicating the parameter threshold value $\Phi_{qTH}$, $I_{TH}$, $SoC_{TH}$, $T_{TH}$, $V_{TH}$ corresponding to the given one of the cell parameters $\Phi_q$, I, SoC, T, V from the module controller 40 by the AC signal over a shared control line 48 to each of the cell controllers 42.

The method 100 further includes 118 blocking DC current by a first blocking capacitor 50 between the shared control line 48 and each of the cell controllers 42, while allowing the AC signal to pass therebetween. Blocking of the DC current may prevent damage to one or more of the cell controllers 42 and/or the switching circuits 30 by isolating those devices from high DC voltages that may exist in the battery module 20.

The method 100 proceeds with the step of 120 comparing, by each of the cell controllers, the measured value of the given one of the cell parameters $\Phi_q$, I, SoC, T, V to the parameter threshold value $\Phi_{qTH}$, $I_{TH}$, $SoC_{TH}$, $T_{TH}$, $V_{TH}$ corresponding to the given one of the cell parameters $\Phi_q$, I, SoC, T, V.

The method 100 includes 122 signaling, by one of the cell controllers 42, a command signal to a corresponding switching circuit 30 to remove an associated one of the battery cells 22 from being in service within the battery module 20 in response to the measured value of the given one of the cell parameters $\Phi_q$, I, SoC, T, V exceeding the parameter threshold value $\Phi_{qTH}$, $I_{TH}$, $SoC_{TH}$, $T_{TH}$, $V_{TH}$ corresponding to the given one of the cell parameters $\Phi_q$, I, SoC, T, V.

The method 100 includes 124 designating one of the cell terminals 24, 26 as a switched cell terminal being selectively connected to a module node 34 of the battery module by a first switch 32, and designating the other one of the cell terminals 24, 26 as a non-switched cell terminal. The switched cell terminal may be either of the positive cell terminal 24 or the negative cell terminal 26. Likewise, the non-switched cell terminal may be either of the positive cell terminal 24 or the negative cell terminal 26, but the non-switched terminal must be the one of the cell terminals 24, 26 with the opposite polarity as the switched cell terminal.

The method 100 also includes 126 inhibiting an electrical current path between the associated one of the battery cells 22 and the module node 34 by a first switch 32 in response to the command signal from the associated cell controller 42 to cause the associated one of the battery cells 22 to be functionally disconnected from service in the battery module 20. More specifically, step 126 includes placing the first switch 32 in an opened condition to inhibit current flow between the switched cell terminal of the associated one of the battery cells 22 and the module node 34.

The method 100 further includes 128 establishing an electrical current path through a bypass conductor 38 around the associated one of the battery cells 22 in response to the command signal from the associated cell controller 42 to cause the associated one of the battery cells 22 to be bypassed and to allow the battery module 20 to function with the associated one of the battery cells 22 being functionally disconnected from service in the battery module 20. More specifically, this step 128 includes closing a second switch 36 to allow a flow of electrical current between the module node 34 and the bypass conductor 38, which is in electrical contact with the non-switched cell terminal. In other words, this step 128 provides for the establishment of an alternative current path through the bypass conductor 38 to allow current flow through the battery module 20 despite the associated battery cell 22 being functionally disconnected therefrom.

A first checking method 200 for determining the condition of one or more battery cells 22 within a battery module 20 is also provided. This checking method 200 includes causing one or more of the battery cells to be disconnected from the battery module 20, and thereby judging the condition of the battery cells 22 within the battery module 20. Therefore, it is preferably to be conducted only when the battery module 20 is not in active use.

The first checking method 200 includes the step of 202 setting each of the parameter threshold values $\Phi_{qTH}$, $I_{TH}$, $SoC_{TH}$, $T_{TH}$, $V_{TH}$ to relatively high values so that most or all of the battery cells 22 are functionally connected to the battery module 20 and are thereby contributing to the module voltage, which is the voltage between the module terminals 28.

The first checking method 200 also includes 204 monitoring by the module controller 40 the module voltage to determine the number of battery cells 22 that are functionally connected to the battery module 20 at any given time.

The first checking method 200 proceeds with the step of 206 progressively lowering at least one of the parameter threshold values $\Phi_{qTH}$, $I_{TH}$, $SoC_{TH}$, $T_{TH}$, $V_{TH}$ and simultaneously monitoring the number of battery cells 22 that are functionally connected to the battery module 20 to determine the condition or health of the battery cells 22 within the battery module 20. This step of 206 progressively lowering at least one of the parameter threshold values $\Phi_{qTH}$, $I_{TH}$, $SoC_{TH}$, $T_{TH}$, $V_{TH}$ may, for example, include recording the parameter threshold value $\Phi_{qTH}$, $I_{TH}$, $SoC_{TH}$, $T_{TH}$, $V_{TH}$ that corresponds with a predetermined number of the battery cells 22 being in service, which may be, for example, a minimum number of the battery cells 22 required for some predetermined purpose. It may include sequentially lowering each of two or more of the parameter threshold values $\Phi_{qTH}$, $I_{TH}$, $SoC_{TH}$, $T_{TH}$, $V_{TH}$ to determine the different responses.

A second checking method 300 for determining the condition of battery cells 22 within a battery module 20 is also provided. The second checking method 300 may be used as an alternative to or as an additional verification of, the first checking method 200. The second checking method 300 includes the step of 302 setting one or more of the parameter threshold values $\Phi_{qTH}$, $I_{TH}$, $SoC_{TH}$, $T_{TH}$, $V_{TH}$ to predetermined values and 304 determining the number of battery cells 22 that are functionally connected to the battery module 20 with the one or more of the parameter threshold values $\Phi_{qTH}$, $I_{TH}$, $SoC_{TH}$, $T_{TH}$, $V_{TH}$ set to the predetermined value. The alternative checking method 300 proceeds with the step of 306 judging the relative health of the battery module 20 based on the number of functionally connected battery cells 22 with the one or more of the parameter threshold values $\Phi_{qTH}$, $I_{TH}$, $SoC_{TH}$, $T_{TH}$, $V_{TH}$ set to the predetermined value.

The relative health or condition of the battery module 20 may be useful for several operational purposes such as, for example, limiting the use of a relatively weak battery module 20 or derating its capacity to prevent further degradation. The relative health may also be used to signal maintenance such as replacing or rebuilding the battery module 20. The relative health of the battery module 20 may also be useful as an indicator of the expected life of the battery module 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for cell balancing comprising:
    a battery module including a plurality of battery cells in a series configuration;
    each battery cell of said plurality of battery cells having a switched cell terminal and a non-switched cell terminal associated therewith;
    one or more switching circuits each configured to switch an associated battery cell of said plurality of battery cells between a first mode with the associated battery cell being in-service with said battery module, and a second mode with the associated battery cell being functionally disconnected from said battery module;
    each of said one or more switching circuits including a first switch configured as a closed circuit in the first mode to allow a flow of electrical current between said switched cell terminal of said associated battery cell and a module node, and as an open circuit in the second mode to block the flow of electrical current between said switched cell terminal of said associated battery cell and the module node;
    each of said one or more switching circuits including a cell bypass conductor in electrical contact with said non-switched cell terminal of said associated battery cell;
    each of said one or more switching circuits including a second switch configured as an open circuit in the first mode to block a flow of electrical current between said cell bypass conductor and the module node, and as an open circuit in the second mode to allow the flow of electrical current between said cell bypass conductor and the module node;
    a cell controller associated with each of said one or more switching circuits and configured to monitor a cell parameter of said associated battery cell associated therewith and to cause said switching circuit to change from the first mode to the second mode in response to said cell parameter exceeding a parameter threshold value.

2. The system as set forth in claim 1, wherein each battery cell of said plurality of battery cells is an associated battery cell having one of said one or more switching circuits associated therewith.

3. The system as set forth in claim 1, further including:
    a threshold input terminal on each of said cell controllers for receiving an input signal corresponding to said parameter threshold value; and
    a shared control line in electrical communication with a module controller and with said threshold input terminal of each of said cell controllers to communicate said parameter threshold value therebetween.

4. The system as set forth in claim 3, wherein said parameter threshold value is one of two or more parameter threshold values;
    wherein said threshold input terminal of each of said cell controllers is one of two or more threshold input terminals of each of said cell controllers; and
    wherein said shared control line is one of two or more shared control lines each in electrical communication with said module controller and with a corresponding one of said two or more threshold input terminals of each of said cell controllers to communicate a corresponding one of said two or more parameter threshold values.

5. The system as set forth in claim 1, further including:
    a parameter output terminal on each of said cell controllers for providing an output signal corresponding to at least one of said cell parameters; and
    a shared monitoring line in electrical communication with each of said cell controllers to communicate said at least one of said cell parameters from each of said cell controllers to a common destination.

6. The system as set forth in claim 5, wherein said shared monitoring line is one of two or more shared monitoring lines, with each of said two or more shared monitoring lines in electrical communication with each of said cell controllers and said common destination.

7. The system as set forth in claim 5, wherein said shared monitoring line is configured to communicate a plurality of said cell parameters.

8. The system as set forth in claim 7, wherein said plurality of said cell parameters are communicated at different times over said shared monitoring line.

9. The system as set forth in claim 7, wherein said plurality of said cell parameters are communicated concurrently over said shared monitoring line.

10. The system as set forth in claim 7, wherein each of said plurality of said cell parameters is associated with a different carrier frequency.

11. The system as set forth in claim 1, wherein said cell parameter is selected from a group comprising: a cell heat flux, a cell current, a cell state of charge, a cell temperature, and a cell voltage.

12. A method for cell balancing comprising:
    measuring values of one or more cell parameters of each of a plurality of battery cells connected in series by a cell controller functionally associated with each of the battery cells;
    comparing by each of the cell controllers the measured values of each of the one or more cell parameters to a parameter threshold value associated with each of the one or more cell parameters;
    signaling by one of the cell controllers a command signal to a corresponding switching circuit to remove an associated one of the battery cells from service within the battery module in response to the measured value of any of the one or more cell parameters exceeding the parameter threshold value associated with a corresponding one of the one or more cell parameters; inhibiting an electrical current path between the associated one of the battery cells and a module node by a first switch in response to the command signal from the associated cell controller to cause the associated one of the battery cells to be functionally disconnected from service in the battery module;

establishing an electrical current path through a bypass conductor around the associated one of the battery cells by a second switch in response to the command signal from the associated cell controller to allow the battery module to function with the associated one of the battery cells being functionally disconnected from service in the battery module.

13. The method as set forth in claim 12, wherein the one or more cell parameters are selected from the group comprising: a cell heat flux, a cell current, a cell state of charge, a cell temperature, and a cell voltage.

14. The method as set forth in claim 12, further including:
receiving an input signal corresponding to the parameter threshold value at a threshold input terminal on each of the cell controllers; and
communicating the parameter threshold value from a module controller to each of the cell controllers over a shared control line.

15. The method as set forth in claim 12, further including:
providing an output signal corresponding to the measured value of one of the one or more cell parameters on an output terminal on each of the cell controllers; and
communicating the measured value of the one of the one or more cell parameters from each of the cell controllers to a common destination over a shared monitoring line.

16. The method as set forth in claim 12, further comprising:
communicating the measured values of one of the one or more cell parameters by each of the cell controllers over a shared monitoring line to a summing module; and
determining an average value of the one of the one of the one or more cell parameters for the plurality of battery cells.

17. The method as set forth in claim 12, further comprising:
setting the parameter threshold value to a relatively high value to cause most or all of the battery cells to be functionally connected to the battery module;
monitoring a module voltage to determine a number of the battery cells that are functionally connected to the battery module at any given time; and
progressively lowering the parameter threshold value while simultaneously monitoring the number of the battery cells that are functionally connected to the battery module to determine the impact of the parameter threshold value on the battery cells.

18. The method as set forth in claim 12, further comprising:
setting the parameter threshold value to a predetermined value;
monitoring a module voltage to determine a number of the battery cells that are functionally connected to the battery module with the parameter threshold value set to the predetermined value; and
judging the relative health of the battery module based on the number of the battery cells that are functionally connected to the battery module with the parameter threshold value set to the predetermined value.

* * * * *